United States Patent [19]
Witte

[11] 4,453,826
[45] Jun. 12, 1984

[54] DOUBLE MONOCHROMATOR

[75] Inventor: Wolfgang Witte, Überlingen, Fed. Rep. of Germany

[73] Assignee: Bodenseewerk Perkin-Elmer & Co., GmbH, Überlingen, Fed. Rep. of Germany

[21] Appl. No.: 346,443

[22] Filed: Feb. 8, 1982

[30] Foreign Application Priority Data

Apr. 7, 1981 [DE] Fed. Rep. of Germany ....... 3113984

[51] Int. Cl.³ ............................................. G01J 3/18
[52] U.S. Cl. ............................................. 356/333
[58] Field of Search ............................ 356/333, 334

[56] References Cited

U.S. PATENT DOCUMENTS

| | | | |
|---|---|---|---|
| 3,909,134 | 9/1975 | Pieuchard et al. | 356/331 |
| 3,930,728 | 1/1976 | Pieuchard et al. | 356/331 |
| 4,371,263 | 2/1983 | Witte | 356/333 |

OTHER PUBLICATIONS

Afanas'ev et al., *Sov. J. Opt. Technol.*, vol. 44, No. 6, Jun. 1977, pp. 362 and 363.
Startsev et al., *Opt. Spectrosc.* (USSR), vol. 46, No. 6, Jun. 1979, pp. 672–675.

*Primary Examiner*—F. L. Evans
*Attorney, Agent, or Firm*—F. L. Masselle; E. T. Grimes; R. A. Hays

[57] ABSTRACT

A pre-monochromator having a grating monochromator includes an unsymmetrically ruled concave diffraction grating, by means of which a light source is directly imaged upon an exit slit. The diffraction grating is unsymmetrical with respect to the distribution of the grating constants such that the image distance remains substantially constant during the rotation of the diffraction grating.

2 Claims, 2 Drawing Figures

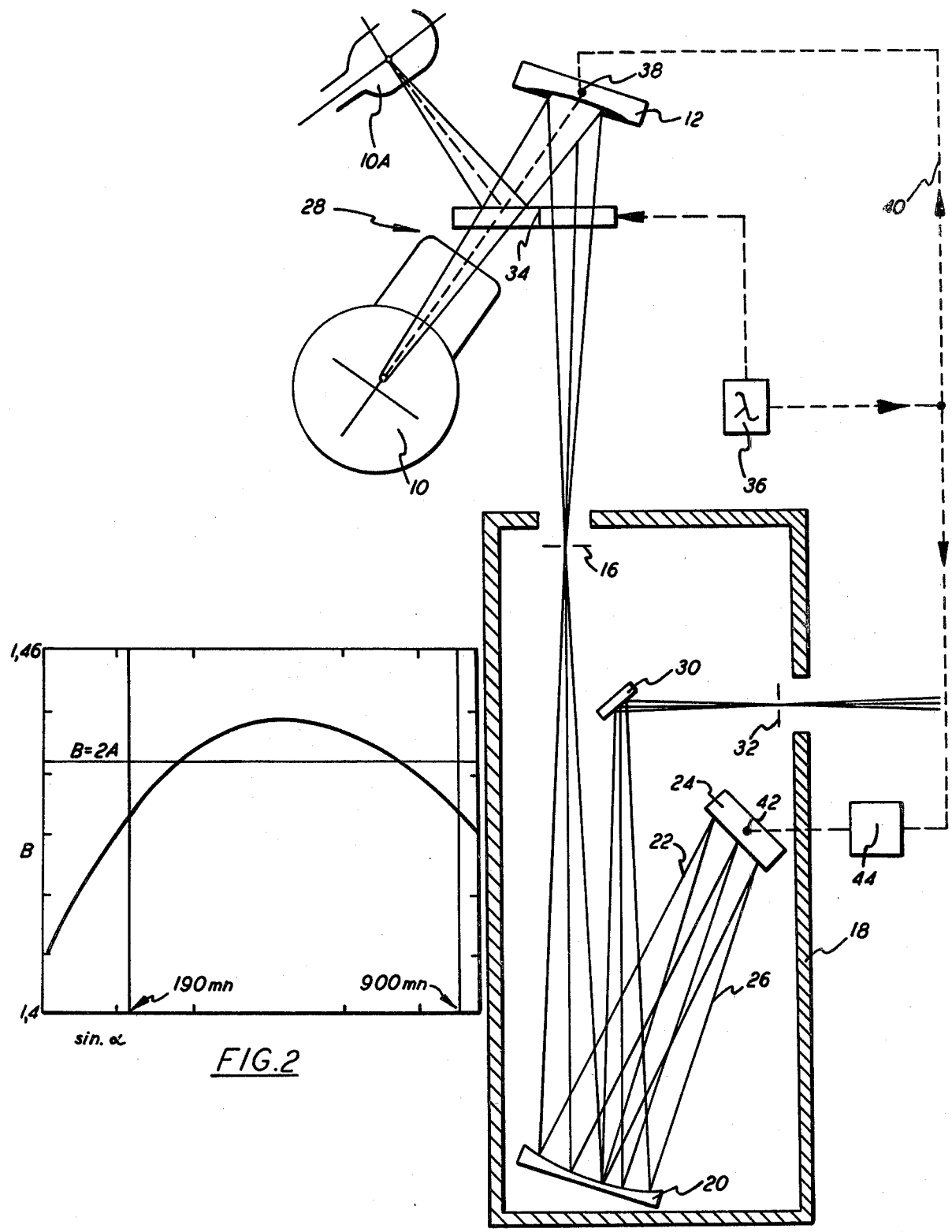

DOUBLE MONOCHROMATOR

BACKGROUND OF THE INVENTION

The present invention generally relates to a double monochromator and, in particular, relates to one having a grating pre-monochromator having an unsymmetrically ruled concave rotatable diffraction grating.

Conventional single monochromator assemblies generally include a light source unit comprising a light source and a concave mirror, via which the light source is imaged upon the entrance slit of the monochromator proper. In such a single monochromator, light having different wavelengths, a continuum for example, impinges upon the entrance slit. This, however, is not the only light which passes through the apparatus to emerge through the exit slit, as there is also a certain proportion of stray light which reaches the exit slit. The stray light can be due to scattering or the like and reaches the exit slit along other paths such that, in addition to the spectral band desired, a proportion of other wavelengths not desired also appears at the exit slit. This proportion may indeed by small. However, due to disadvantageous sensitivity characteristics of many photoelectric detectors, generally having a steeply dropping slope at the edge of the scanned wavelength range, the ratio of the stray light, or noise, signal to the useful signal may be intolerable.

The use of a pre-monochromator in place of a light source in a double monochromator is generally known from DE-AS 27 30 613. This pre-monochromator comprises a fixed concave mirror and rotatable flat diffraction grating. The light beam emitted by the light source is directed by the concave mirror onto the diffraction grating. A monochromatic light beam, the wavelength of which depends on the position of the rotatable diffraction grating, is thus directed upon the entrance slit of the main monochromator. The two monochromators are synchronously tuned via any conventional wavelength drive. Thus, only light of a desired wavelength range reaches the path of rays of the main monochromator. Thereby, the proportion of stray light reaching the exit slit is considerably reduced.

The pre-monochromator of DE-AS 27 30 613 is of particularly simple design. The concave mirror is disposed in the path of rays in front of the diffraction grating such that it directs a convergent light beam onto the diffraction grating. The pre-monochromator has a substantially larger spectral bandwidth than the main monochromator. The wavelength drive includes a setting drive causing rotation of the diffraction grating of the pre-monochromator which rotation is linear with wavelength. Due to this simple design, such a pre-monochromator in many cases may be provided instead of a lamp unit of a single monochromator without substantial variations of the basic design of the instrument. In many designs, however, this is not possible.

Monochromators having concave gratings are known from U.S. Pat. Nos. 3,909,134 and 3,930,728. In such monochromators, the grating is rotated about its nodal point. The monochromator includes fixed entrance and exit slits having particular positions with respect to the grating. The imaging of the entrance slit via the grating upon the exit slit is affected only slightly by the rotation of the grating.

In U.S. Pat. No. 3,909,134 the grating rulings are formed by the lines of intersection of the spherical calotte forming the concave grating with a plurality of quadrics of revolution, a focal point of each of these quadrics of rotation coinciding with the center of curvature of the spherical calotte. Therefore, the grating is symmetrical with respect to the distribution of the grating rulings. In U.S. Pat. No. 3,930,728, the grating rulings of a holographically manufactured grating are defined by interference lines produced on the spherical calotte forming the grating by two coherent light sources unsymmetrically disposed with respect to the grating in particular manner. This condition leads to an unsymmetrical distribution of the grating lines.

SUMMARY OF THE INVENTION

It is one object of the present invention to provide a double monochromator wherein the pre-monochromator is provided with an unsymmetrically ruled concave diffraction grating instead of the conventional lamp-unit of a single monochromator.

Other objects and advantages will become apparent from the following detailed specification and the accompanying drawing.

BRIEF DESCRIPTION OF THE DRAWING

The invention is described in greater detail hereinbelow with reference to the accompanying drawings, not drawn to scale, in which:

FIG. 1 is an optical diagram of a double monochromator embodying the principles of the present invention; and FIG. 2 is a graphic representation of the image distance of a concave diffraction grating as a function of wavelength.

DETAILED DESCRIPTION OF THE INVENTION

In FIG. 1, a light source, generally indicated at 10, is imaged upon the entrance slit 16 of a main monochromator 18 by means of a rotatable concave diffraction grating 12. The main monochromator 18 contains a collimating mirror 20 disposed in the focal plane of the entrance slit 16.

The collimating mirror 20 directs an incident parallel light beam 22 onto a diffraction grating 24. Diffraction grating 24 reflects a diffracted parallel light beam 26 for each of the wavelengths. Normally, a continuum of diffracted parallel light beams would be reflected and dispersed by the diffraction grating 24 according to the wavelength. However, due to the presence of the pre-monochromator, generally designated at 28, a relatively small spectral band is selected from this continuum. The diffracted parallel light beams 26 are again directed onto the collimating mirror 20 which in turn produces, via plane mirror 30 from the parallel light beams 26, a small spectral band consisting of images of the entrance slit 16 in the plane of an exit slit 32.

A filter slide 34 extends into the path of rays of the pre-monochromator 28 between light source 10 and the diffraction grating 12. This filter slide 34 is preferably coupled to a wavelength drive 36. Furthermore, the concave diffraction grating 12, which is rotatable about an axis 38, is also coupled to the wavelength drive 36 by a linear, or otherwise as simply as possible constructed, setting drive 40, indicated by the dashed line. The diffraction grating 24 of the main monochromator 18 rotatable about an axis 42 is also coupled to the wavelength drive 36 by means of a sine drive 44 such that the sine of the angle of rotation is proportional to the wavelength determined by wavelength drive 36. Such a sine drive, which is well known per se, may include a spindle which is rotatable in proportion to the wavelength, which spindle carries a rectilinearly guided nut. A lever connected to the diffraction grating 24 non-positively engages a plane surface of the nut.

At a certain wavelength a plane mirror is moved into the path of rays by means of a filter slide 34. That is, one of the discrete segments of the filter slide 34 contains a plane mirror. The light beam of a second light source 10A, for example, a tungsten lamp is thus reflected into the path of rays by means of this plane mirror.

In the device described above it is preferable that the light source 10 be continuously imaged upon the plane of the entrance slit 16 by means of the concave diffraction grating 12 such that the variation of the image distance is minimized. In contrast to normal flat diffraction gratings, concave diffraction gratings do not exhibit a uniform grating constant. Rather, the grating constant of a concave diffraction grating varies across the grating surface. The variation of the image distance with wavelength is dependent on this variation. Conventionally, the variation of the grating constant across the grating surface is symmetrical, so much so that the grating rulings, as viewed from in front of the grating, appear equally spaced. The gradient of the grating constant in the vertex of the diffraction grating is zero. Such a design of the diffraction grating leads to a considerable variation of the image distance with the wavelength.

In the present device, the grating constant varies unsymmetrically across the grating. In the center, or vertex, of the grating a finite gradient of the grating constants results therefrom. Thus, the parameters are selected to ensure that the image distance does not vary substantially during the rotation of the grating. Thus, during the variation of the wavelength of the radiation the image remains directly on the entrance slit 16.

In the preferred embodiment, the following parameters of the geometrical arrangement are selected:

The object distance is 'a'=60 mm, the image distance is 'b'=120 mm, whereby an imaging ratio of 2:1 results therefrom. The angle between the incident and emergent beams is 'B'=35°.

In addition, formulas have been derived which permit the calculation of the image distance with a concave diffraction grating for arbitrary imaging ratios different from 1:1. The variations of the image distances in the preferred embodiment were plotted by means of a computer which supplied the result in the form of graphic representations for different parameters. In selecting a suitable parameter, a concave diffraction grating 12 is selected which exhibits a practically negligible variation of image distances with the above given quantities of a, b and B in the spectral range from 190 nm to 900 nm.

In one embodiment,

1/g=600 lines/mm was chosen as the inverse value of the grating constant 'g' in the center of the diffraction grating. The radius of curvature of the diffraction grating is R=83.2 mm.

The relative gradient of the grating constant, that is, the variation of the grating constant per millimeter referenced to the absolute value of the grating constant is

G'=−0.00393 at the vertex of the grating.

The following limits result for the above-mentioned wavelength range for the range of the rotation angle:

| λ[nm] | sin α |
|---|---|
| 190 | 0.0598 |
| 900 | 0.2831. |

In FIG. 2, sin α is plotted along the abcissa on a linear measure of wavelength. The above-mentioned range limits are designated by the two vertical lines. The normalized image distance is, $$B = b/R,$$

and the image distance referenced to the radius of curvature R of the diffraction grating 12, is plotted as ordinate. Correspondingly, the normalized object distance is, $$A = a/R$$

The desired value $B_s$ of the normalized image distance B, to which an imaging on the entrance slit 16 of the main monochromator 18 corresponds, is, $$B_s = 2A.$$

In FIG. 2, this desired value is designated by a horizontal line. It can be seen that with the selected parameters A, B and G' the maximum positive and negative deviations of image distance B from value 2A are approximately the same. They are practically negligible, if the ordinate extension of FIG. 2 between an ordinate range of 1.4 and 1.46 is taken into account. The relative image distance B lies in the range of $$B = 2A \pm 0.008,$$

corresponding to a deviation of ±0.55%. For the absolute image distance b, this yields b=120 mm±0.66 mm.

Therefore, the variations of the image distances are smaller by an order of magnitude than in the device of DE-AS 27 30 613 (see Table 1 therein) in a more single and thus favorable mechanical structure.

The rotation of diffraction grating 12 is not effected by a sine drive but linearly with the wavelength, for example. The pre-monochromator 28 has a substantially larger band width than the main monochromator 18. It may be shown that, with the conditions described above, the linear rotation of the diffraction grating 12 (instead of a rotation through a sine drive) has practically no effect upon the spectral composition of the radiation entering the main monochromator 18.

The invention has been explained hereinbefore by means of a concrete example having particular geometrical conditions. The application of the invention, however, is not limited to this concrete embodiment. In above-mentioned manner, an asymmetry of the diffraction grating may also be derived with the components having different dimensions and different distances, which asymmetry leads to a practical independence of the focal and the image distances of the convave diffraction grating from the wavelength.

The setting drive 40 may be linear. It may also have a small non-linear (non-sinusoidal) characteristic, of such a characteristic results from reasons of design simplification. Finally, movement of diffraction grating 12 could, of course, be caused also by means of a sine drive, even if such a movement, properly speaking, is not necessary for the pre-monochromator.

It is understood that from the above specification other arrangements and embodiments may become apparent to one skilled in the art without departing from the spirit and scope of the present invention. Thus, the above specification is deemed exemplary and the present invention is defined by the appended claims and the reasonable interpretation thereof.

What is claimed is:

1. Double monochromator for monochromatizing radiation of a light source; said double monochromator comprising:

a main monochromator, said main monochromator having an entrance slit, an exit slit and a planar grating the position of which is controlled by a sine drive associated therewith;

a pre-monochromator having a rotatable concave diffraction grating which continuously images said light source on said entrance slit of said main monochromator, said grating being non-symmetrically divided so that the image width remains substantially unchanged through the rotation thereof, said double monochromator having an operating range of wavelengths between from about 190 nm to about 900 nm; and a linear wavelength drive associated with said pre-monochromator grating and being synchronously tuned with said sine drive of said main monochromator.

2. Double monochromator as claimed in claim 1 wherein:

said pre-monochromator has a substantially larger band width than said main monochromator.

* * * * *